US012705662B2

(12) United States Patent
Palmert et al.

(10) Patent No.: US 12,705,662 B2
(45) Date of Patent: Aug. 11, 2026

(54) GENERATION OF RECOMMENDATIONS FROM DYNAMICALLY-MAPPED DATA

(71) Applicant: Salesforce, Inc., San Francisco, CA (US)

(72) Inventors: Joel Ragnar Palmert, Stockholm (SE); Kiran Hariharan Nair, Dublin, CA (US); Merwan Hade, San Francisco, CA (US); Nikhil Kataria, Emeryville, CA (US); Jia Lian Wang, San Francisco, CA (US); Michael Moriarty, Cincinatti, OH (US)

(73) Assignee: Salesforce, Inc., San Francisco, CA (US)

( * ) Notice: Subject to any disclaimer, the term of this patent is extended or adjusted under 35 U.S.C. 154(b) by 65 days.

(21) Appl. No.: 18/528,520

(22) Filed: Dec. 4, 2023

(65) Prior Publication Data

US 2024/0104630 A1 Mar. 28, 2024

Related U.S. Application Data

(63) Continuation of application No. 16/774,200, filed on Jan. 28, 2020, now Pat. No. 11,875,393.

(51) Int. Cl.

| | |
|---|---|
| ***G06Q 30/0601*** | (2023.01) |
| ***G06F 16/242*** | (2019.01) |
| ***G06F 16/28*** | (2019.01) |

(52) U.S. Cl.
CPC ..... *G06Q 30/0631* (2013.01); *G06F 16/2445* (2019.01); *G06F 16/288* (2019.01); *G06Q 30/0627* (2013.01)

(58) Field of Classification Search
CPC ............ G06Q 30/0631; G06Q 30/0627; G06F 16/2445; G06F 16/288
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz |
| 5,649,104 | A | 7/1997 | Carleton |
| 5,715,450 | A | 2/1998 | Ambrose |

(Continued)

OTHER PUBLICATIONS

Office Action (Non-Final Rejection) dated May 12, 2022 for U.S. Appl. No. 16/774,200 (pp. 1-32).

(Continued)

*Primary Examiner* — Pierre Vital
*Assistant Examiner* — Zuheir A Mheir
(74) *Attorney, Agent, or Firm* — Kwan & Olynick LLP

(57) ABSTRACT

System and methods are described for generating recommendations from dynamically-mapped data. In one implementation, a database system receives a first request to generate a recommendation objection and a second request to retrieve additional data to include in the recommendation object. The database system retrieves the recommendation data from a first database table. The database system identifies the additional data in a second database table that is stored separately from the first database table. The database system generates the recommendation object to include the recommendation data from the first database, and maps the additional data to one or more fields of the recommendation object.

20 Claims, 9 Drawing Sheets

(56) References Cited

U.S. PATENT DOCUMENTS 5,761,419 A 6/1998 Schwartz
5,819,038 A 10/1998 Carleton
5,821,937 A 10/1998 Tonelli
5,831,610 A 11/1998 Tonelli
5,873,096 A 2/1999 Lim
5,918,159 A 6/1999 Fomukong
5,963,953 A 10/1999 Cram
6,092,083 A 7/2000 Brodersen
6,169,534 B1 1/2001 Raffel
6,178,425 B1 1/2001 Brodersen
6,189,011 B1 2/2001 Lim
6,216,135 B1 4/2001 Brodersen
6,233,617 B1 5/2001 Rothwein
6,266,669 B1 7/2001 Brodersen
6,295,530 B1 9/2001 Ritchie
6,324,568 B1 11/2001 Diec
6,324,693 B1 11/2001 Brodersen
6,336,137 B1 1/2002 Lee
D454,139 S 3/2002 Feldcamp
6,367,077 B1 4/2002 Brodersen
6,393,605 B1 5/2002 Loomans
6,405,220 B1 6/2002 Brodersen
6,434,550 B1 8/2002 Warner
6,446,089 B1 9/2002 Brodersen
6,535,909 B1 3/2003 Rust
6,549,908 B1 4/2003 Loomans
6,553,563 B2 4/2003 Ambrose
6,560,461 B1 5/2003 Fomukong
6,574,635 B2 6/2003 Stauber
6,577,726 B1 6/2003 Huang
6,601,087 B1 7/2003 Zhu
6,604,117 B2 8/2003 Lim
6,604,128 B2 8/2003 Diec
6,609,150 B2 8/2003 Lee
6,621,834 B1 9/2003 Scherpbier
6,654,032 B1 11/2003 Zhu
6,665,648 B2 12/2003 Brodersen
6,665,655 B1 12/2003 Warner
6,684,438 B2 2/2004 Brodersen
6,711,565 B1 3/2004 Subramaniam
6,724,399 B1 4/2004 Katchour
6,728,702 B1 4/2004 Subramaniam
6,728,960 B1 4/2004 Loomans
6,732,095 B1 5/2004 Warshavsky
6,732,100 B1 5/2004 Brodersen
6,732,111 B2 5/2004 Brodersen
6,754,681 B2 6/2004 Brodersen
6,763,351 B1 7/2004 Subramaniam
6,763,501 B1 7/2004 Zhu
6,768,904 B2 7/2004 Kim
6,782,383 B2 8/2004 Subramaniam
6,804,330 B1 10/2004 Jones
6,826,565 B2 11/2004 Ritchie
6,826,582 B1 11/2004 Chatterjee
6,826,745 B2 11/2004 Coker
6,829,655 B1 12/2004 Huang
6,842,748 B1 1/2005 Warner
6,850,895 B2 2/2005 Brodersen
6,850,949 B2 2/2005 Warner
7,340,411 B2 3/2008 Cook
7,620,655 B2 11/2009 Larsson
7,680,828 B2 3/2010 Gorelik
7,962,504 B1 6/2011 Mehanna
8,433,705 B1 * 4/2013 Dredze ............... G06F 16/3322 707/723
8,560,494 B1 10/2013 Downing
9,595,068 B2 * 3/2017 Tedjamulia ........ G06Q 30/0631
10,033,702 B2 * 7/2018 Ford ....................... G06F 21/64
10,346,476 B2 7/2019 Bequet
10,824,940 B1 11/2020 Rybakov
10,943,199 B1 * 3/2021 Nidy .................. G06Q 30/0643
11,137,987 B2 * 10/2021 Namarvar ............. G06F 16/435
11,270,215 B2 * 3/2022 Reyes ................... H04L 67/535
11,276,120 B2 * 3/2022 Wingate-Whyte .......................... G06Q 30/0282
11,295,322 B1 * 4/2022 Yien .................... G06Q 10/083
2001/0044791 A1 11/2001 Richter
2002/0072951 A1 6/2002 Lee
2002/0082892 A1 6/2002 Raffel
2002/0129352 A1 9/2002 Brodersen
2002/0140731 A1 10/2002 Subramaniam
2002/0143997 A1 10/2002 Huang
2002/0162090 A1 10/2002 Parnell
2002/0165742 A1 11/2002 Robins
2003/0004971 A1 1/2003 Gong
2003/0018705 A1 1/2003 Chen
2003/0018830 A1 1/2003 Chen
2003/0066031 A1 4/2003 Laane
2003/0066032 A1 4/2003 Ramachandran
2003/0069936 A1 4/2003 Warner
2003/0070000 A1 4/2003 Coker
2003/0070004 A1 4/2003 Mukundan
2003/0070005 A1 4/2003 Mukundan
2003/0074418 A1 4/2003 Coker
2003/0120675 A1 6/2003 Stauber
2003/0151633 A1 8/2003 George
2003/0159136 A1 8/2003 Huang
2003/0187921 A1 10/2003 Diec
2003/0189600 A1 10/2003 Gune
2003/0204427 A1 10/2003 Gune
2003/0206192 A1 11/2003 Chen
2003/0225730 A1 12/2003 Warner
2004/0001092 A1 1/2004 Rothwein
2004/0010489 A1 1/2004 Rio
2004/0015981 A1 1/2004 Coker
2004/0027388 A1 2/2004 Berg
2004/0128001 A1 7/2004 Levin
2004/0186860 A1 9/2004 Lee
2004/0193510 A1 9/2004 Catahan
2004/0199489 A1 10/2004 Barnes-Leon
2004/0199536 A1 10/2004 Barnes Leon
2004/0199543 A1 10/2004 Braud
2004/0249854 A1 12/2004 Barnes-Leon
2004/0260534 A1 12/2004 Pak
2004/0260659 A1 12/2004 Chan
2004/0268299 A1 12/2004 Lei
2005/0050555 A1 3/2005 Exley
2005/0091098 A1 4/2005 Brodersen
2011/0066497 A1 3/2011 Gopinath
2014/0012886 A1 1/2014 Downing
2014/0214586 A1 7/2014 Muench
2015/0032508 A1 1/2015 Lotlikar
2015/0363862 A1 12/2015 Ranft
2017/0098009 A1 4/2017 Srinivasan
2017/0236131 A1 * 8/2017 Nathenson ......... G06Q 30/0201 705/26.7
2018/0052898 A1 * 2/2018 Allan .................... G06F 16/435
2018/0096417 A1 * 4/2018 Cook ....................... G06N 5/01
2019/0121801 A1 * 4/2019 Jethwa .................. G06F 16/243
2019/0147084 A1 * 5/2019 Pal .......................... G06F 16/25 707/769
2019/0164134 A1 * 5/2019 Morrow ............. G06Q 10/1057
2019/0303446 A1 * 10/2019 Franz .................... G06F 40/274
2019/0318409 A1 * 10/2019 Vallelunga .......... G06F 16/9535
2021/0064676 A1 * 3/2021 Rawal .................. G06V 30/274
2021/0383454 A1 * 12/2021 Anderson .......... G06Q 30/0629
2023/0178223 A1 * 6/2023 Mancl .................... G16H 10/60 705/3
2023/0252054 A1 * 8/2023 Hou ...................... G06F 16/287 707/603

OTHER PUBLICATIONS

Office Action (Non-Final Rejection) dated Mar. 15, 2023 for U.S. Appl. No. 16/774,200 (pp. 1-21).
Office Action (Final Rejection) dated Nov. 9, 2022 for U.S. Appl. No. 16/774,200 (pp. 1-26).
Office Action (Notice of Allowance and Fees Due (PTOL-85)) dated Sep. 26, 2023 for U.S. Appl. No. 16/774,200 (pp. 1-9).

* cited by examiner

GENERATION OF RECOMMENDATIONS FROM DYNAMICALLY-MAPPED DATA

CROSS REFERENCE TO RELATED APPLICATIONS

This application is a continuation application and, pursuant to 35 U.S.C. § 120, is entitled to and claims the benefit of earlier filed application U.S. application Ser. No. 16/774,200, filed Jan. 28, 2020, entitled "GENERATION OF RECOMMENDATIONS FROM DYNAMICALLY-MAPPED DATA", the content of which is incorporated herein by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate to generating recommendations, and, more specifically, to dynamically mapping data to recommendations from separate data sources without data duplication.

BACKGROUND

"Cloud computing" services provide shared resources, software, and information to computers and other devices upon request or on demand. Distributed data is often needed by a single system to perform specialized operations, such as preparing customized content, such as recommendations, but such data is typically stored in multiple remote systems. A common approach to solve this problem is to replicate data between databases. However, this approach is often expensive in terms of network and computing resources. Moreover, it introduces new problems related to data synchronization.

BRIEF DESCRIPTION OF THE DRAWINGS

The included drawings are for illustrative purposes and serve to provide examples of possible structures and operations for the disclosed inventive systems, apparatus, methods, and computer-readable storage media. These drawings in no way limit any changes in form and detail that may be made by one skilled in the art without departing from the spirit and scope of the disclosed implementations.

DETAILED DESCRIPTION

Figure 1A:
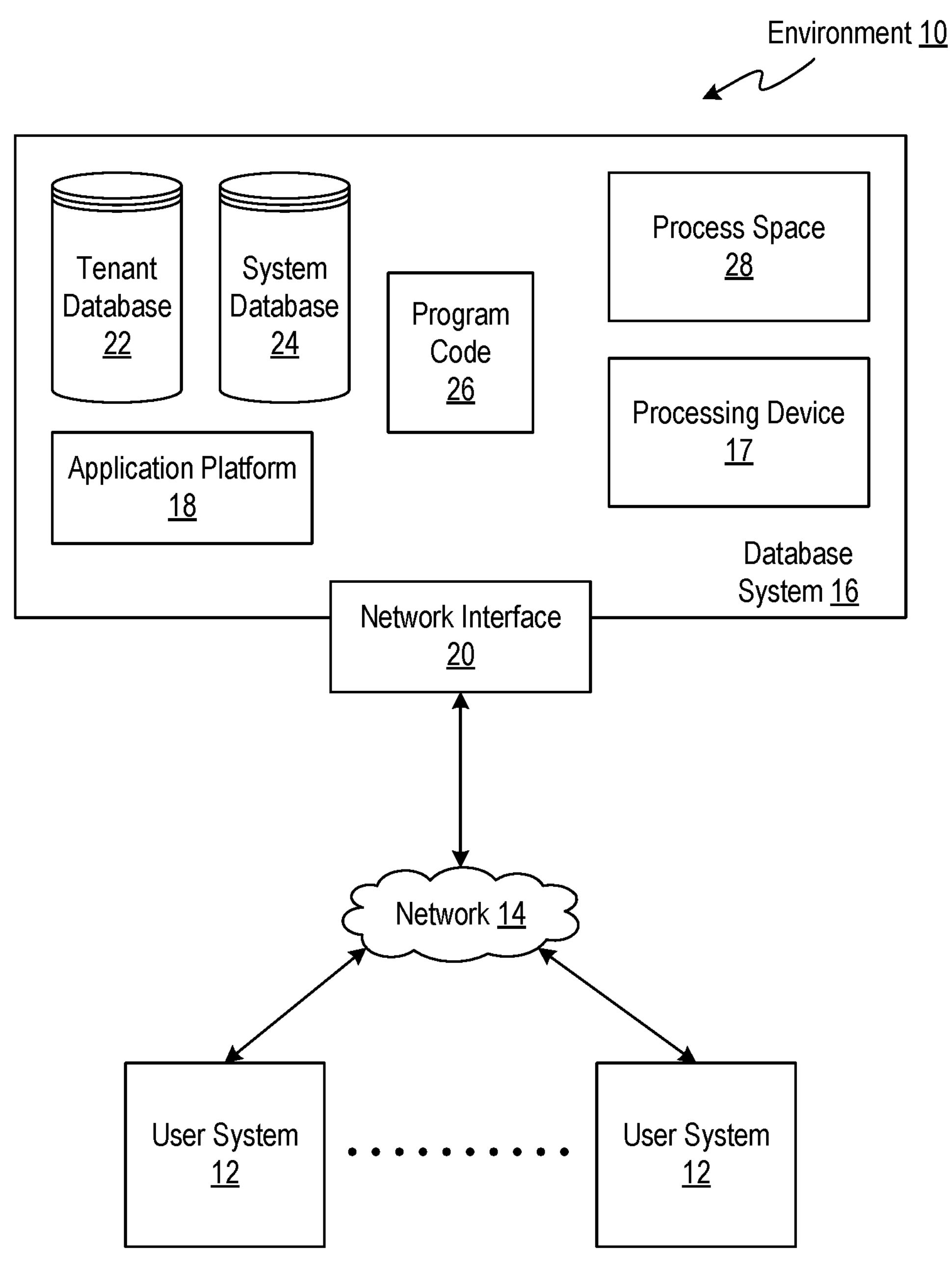
FIG. 1A shows a block diagram of an example environment in which an on-demand database service can be used according to some implementations.

The implementations described herein relate to generating content (e.g., recommendations) from dynamically-mapped data. Recommendation objects are records (similar to accounts and contacts) that are processed by action strategies and are associated with process flows. Action strategies determine when to present recommendations and what content to include using business rules, predictive models, and other data sources. The result of this process is context-specific recommendations that are presented to end users. For example, Einstein Next Best Action provides functionality to generate recommendation objects from process flows (or strategies), provides predictive modeling to determine when recommendations should be provided to particular users, and determines what process flow should be executed to complete the recommendation.

When developing recommendation strategies, such as interactive recommendations for visual presentation, it may be desirable to load data from multiple sources without duplicating such data. Current systems, however, do not enable this functionality, and generally require duplicating data unnecessarily by adding it to the stored recommendation data.

The implementations described herein address these and other limitations of current systems by generating recommendations that dynamically load data from data sources other than a data source associated with stored recommendation data (e.g., a recommendation database). In a non-limiting example, a user may wish to sell certain products to customers, and product definitions and descriptions may be stored in a separate product database. If the user desires to implement a recommendation strategy where recommendations are sent to certain customers to buy certain products, the user may wish to directly load relevant data from the product database into the recommendation rather than being required to first copy all the product data to the recommendation database.

Advantages of the implementations of the disclosure over current systems include, but are not limited to: (1) enabling real-time or near real-time updates to recommendation objects that are served as visual recommendations via a graphical user interface (GUI); updates to underlying business objects, for example, from which the data is sourced can be reflected in real-time or near real-time during a user session; (2) avoiding the need to duplicate data, which dramatically improves efficiency in situations when a target database table contains large amounts of data; and (3)

allowing a user to build recommendation strategies graphically without the need to write code.

As used herein, the term "recommendation object" refers to a data structure containing information used to provide a static or interactive recommendation to a customer during the customer's interaction with a GUI implemented by a software application. The recommendation object may include, for example, pre-defined data fields that are populated with recommendation data either before or at runtime.

Also as used herein, the term "field" or "data field" in the context of a recommendation object refers to variables that contain or point to actual strings/values that are used to generate a recommendation object or are extracted from the recommendation object and displayed to a user to which a recommendation is presented.

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

In addition, the articles "a" and "an" as used herein and in the appended claims should generally be construed to mean "one or more" unless specified otherwise or clear from context to be directed to a singular form. Reference throughout this specification to "an implementation," "one implementation," "some implementations," or "certain implementations" indicates that a particular feature, structure, or characteristic described in connection with the implementation is included in at least one implementation. Thus, the appearances of the phrase "an implementation," "one implementation," "some implementations," or "certain implementations" in various locations throughout this specification are not necessarily all referring to the same implementation.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "adding," "subtracting," "multiplying," "dividing," "optimizing," "calibrating," "detecting," "performing," "analyzing," "determining," "enabling," "identifying," "modifying," "transforming," "applying," "aggregating," "extracting," "registering," "querying," "populating," "hydrating," "updating," "mapping," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM, and the like without departing from the scope of the implementations claimed. Moreover, the implementations are applicable to other systems and environments including, but not limited to, client-server models, mobile technology and devices, wearable devices, and on-demand services.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Any of the software components or functions described in this application can be implemented as software code to be executed by one or more processors using any suitable computer language such as, for example, C, C++, Java™ (which is a trademark of Sun Microsystems, Inc.), or Perl using, for example, existing or object-oriented techniques. The software code can be stored as non-transitory instructions on any type of tangible computer-readable storage medium (referred to herein as a "non-transitory computer-readable storage medium"). Examples of a non-transitory computer-readable storage medium include random access memory (RAM), read-only memory (ROM), magnetic media such as a hard-drive or a floppy disk, or an optical medium such as a compact disc (CD) or digital versatile disc (DVD), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

The disclosure also relates to apparatuses, devices, and system adapted/configured to perform the operations herein. The apparatuses, devices, and systems may be specially constructed for their required purposes, may be selectively activated or reconfigured by a computer program, or some combination thereof.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the database system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the database system 16, is a service that is made available to users outside an enterprise (or enterprises) that owns, maintains, or provides access to the database system 16. As described above, such users generally do not need to be concerned with building or maintaining the database system 16. Instead, resources provided by the database system 16 may be available for such users' use when the users need services provided by the database system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of the database system 16 to execute, such as the hardware or software infrastructure of the database system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the database system 16 implements a web-based customer relationship management (CRM) system. For example, in some such implementations, the database system 16 includes application servers configured to implement and execute CRM software applications as well as provide related data, code, forms, renderable web pages, and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The database system 16 also implements applications other than, or in addition to, a CRM application. For example, the database system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the database system 16.

According to some implementations, each database system 16 is configured to provide web pages, forms, applications, data, and media content to user (client) systems 12 to support the access by user systems 12 as tenants of the database system 16. As such, the database system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application, such as an object-oriented database management system (OODBMS) or a relational database management system (RDBMS), as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), wide area network (WAN), telephone network, wireless network, cellular network, point-to-point network, star network, token ring network, hub network, or other appropriate configuration. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with the database system 16 using TCP/IP and, at a higher network level, other common Internet protocols to communicate, such as the Hyper Text Transfer Protocol (HTTP), Hyper Text Transfer Protocol Secure (HTTPS), File Transfer Protocol (FTP), Apple File Service (AFS), Wireless Application Protocol (WAP), etc. In an example where HTTP is used, each user system 12 can include an HTTP client commonly referred to as a "web browser" or simply a "browser" for sending and receiving HTTP signals to and from an HTTP server of the database system 16. Such an HTTP server can be implemented as the sole network interface 20 between the database system 16 and the network 14, but other techniques can be used in addition to or instead of these techniques. In some implementations, the network interface 20 between the database system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. When discussed in the context of a user, the terms "user system," "user device," and "user computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, personal digital assistant (PDA), or other wireless device, allowing a user (for example, a subscriber of on-demand services provided by the database system 16) of the user system 12 to access, process, and view information, pages, and applications available to it from the database system 16 over the network 14.

Each user system 12 also typically includes one or more user input devices, such as a keyboard, a mouse, a trackball, a touch pad, a touch screen, a pen or stylus, or the like, for interacting with a GUI provided by the browser on a display (for example, a monitor screen, liquid crystal display (LCD), light-emitting diode (LED) display, etc.) of the user system 12 in conjunction with pages, forms, applications, and other information provided by the database system 16 or other systems or servers. For example, the user interface device can be used to access data and applications hosted by database system 16, and to perform searches on stored data, or otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the database system 16, that user system can have the capacities allotted to the salesperson. However, while an administrator is using that user system 12 to interact with the database system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU), such as an Intel Pentium® processor or the like. Similarly, the database system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The database system 16 includes non-transitory computer-readable storage media having instructions stored thereon that are executable by or used to program a server or other computing system (or collection of such servers or computing systems) to perform some of the implementation of processes described herein. For example, the program code 26 can include instructions for operating and configuring the database system 16 to intercommunicate and to process web pages, applications, and other data and media content as described herein. In some implementations, the program code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, DVDs, CDs, microdrives, magneto-optical discs, magnetic or optical cards, nanosystems (including molecular memory integrated circuits), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known.

Figure 1B:
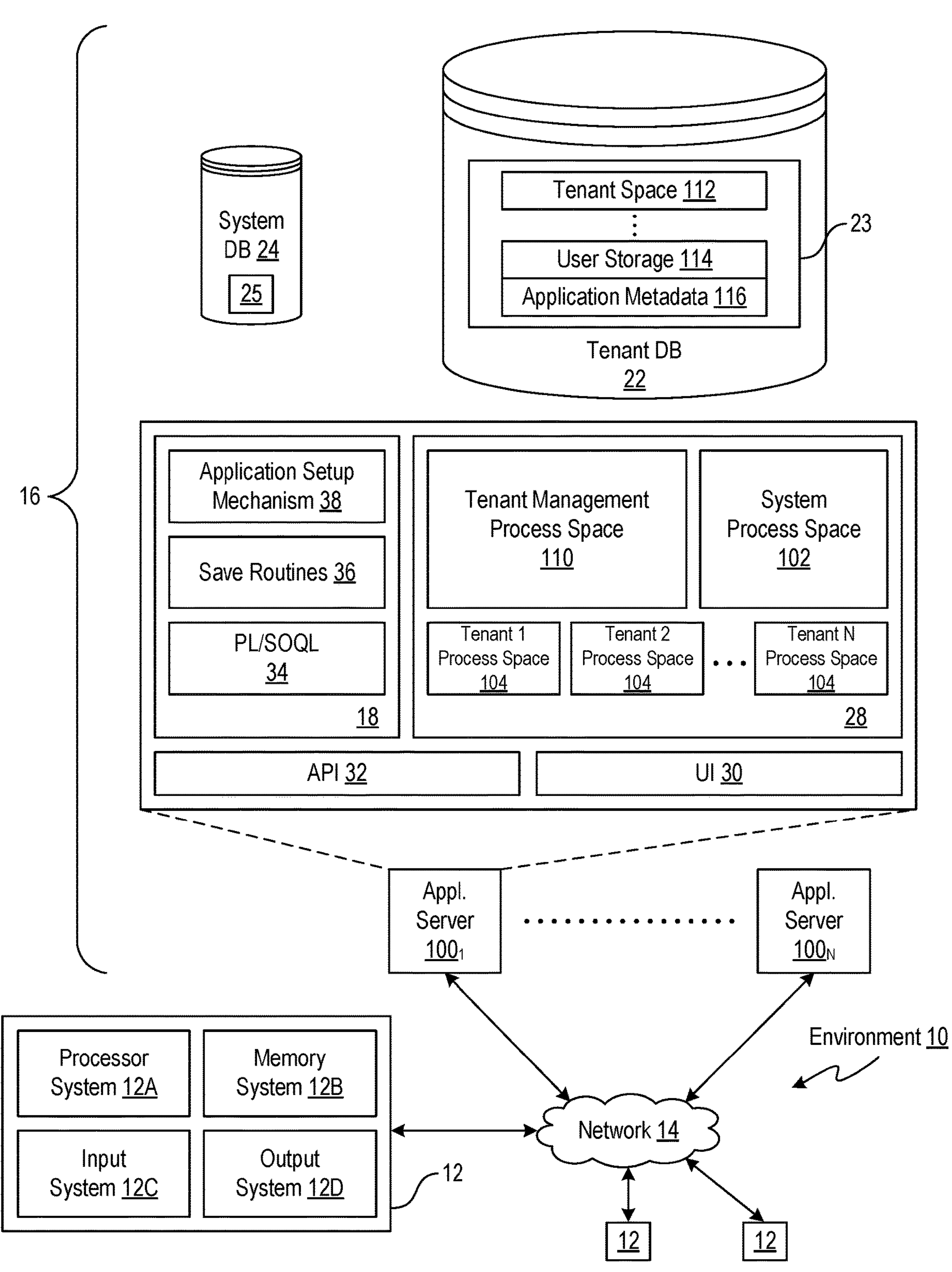
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the database system 16 and various interconnections between such elements are shown with more specificity according to some more specific implementations. In some implementations, the database system 16 may not have the same elements as those described herein or may have other elements instead of, or in addition to, those described herein.

In FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $\mathbf{100}_1$-$\mathbf{100}_N$. Each application server 100, also referred to herein as an "app server," is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114, and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

Figure 1C:
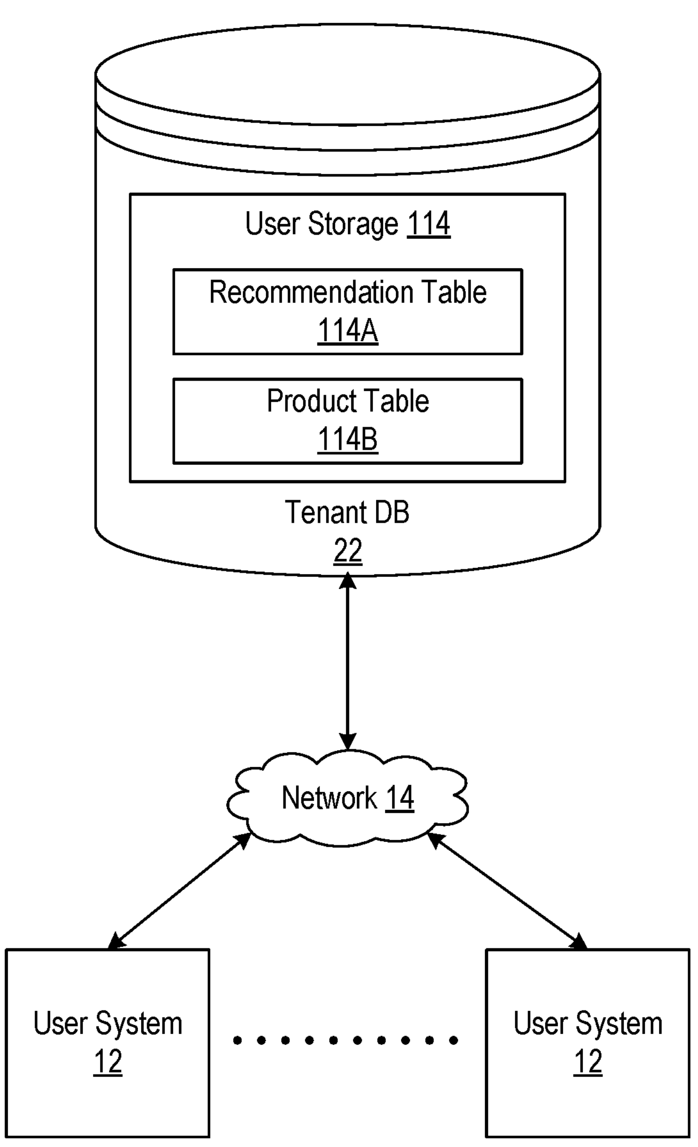
FIG. 1C shows a block diagram illustrating storage of separate database tables according to some implementations.
Figure 4:
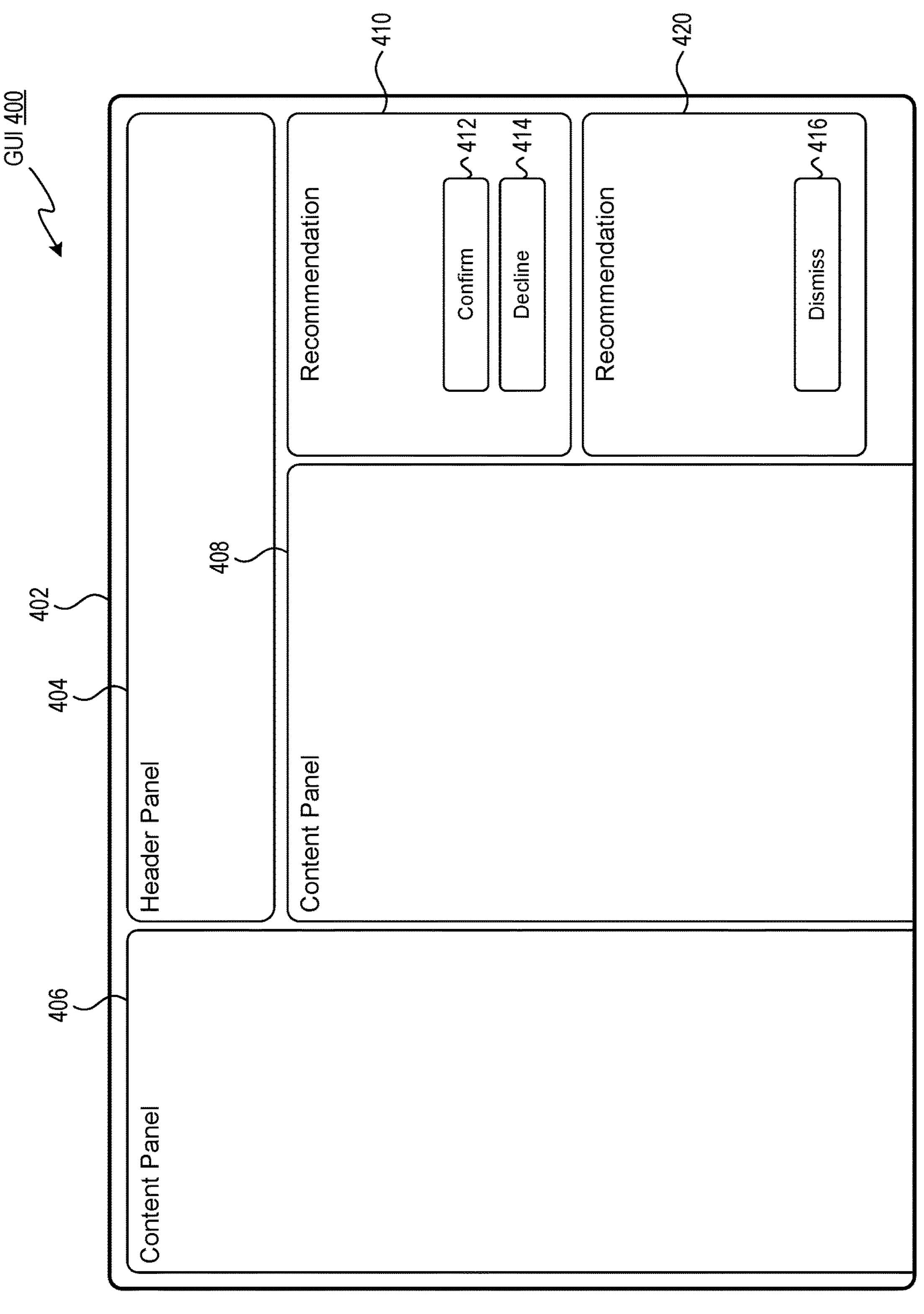
FIG. 4 illustrates an exemplary graphical user interface for presenting recommendations according to some implementations.

Reference is now made to FIG. 1C, which is a block diagram of example implementations of elements of FIG. 1B illustrating storage of separate database tables according to some implementations. The user storage 114 may include data utilized by a tenant of a particular organization, which may be distributed in different database tables. For example, FIG. 1C shows a particular implementation that may be used in connection with the embodiments described later with respect to FIGS. 4-7. In this implementation, the user storage 114 includes, for example, a recommendation table 114A that includes recommendation data, which may be used in downstream applications for which recommended actions are to be presented to a user via a GUI, for example, as illustrated in FIG. 4. The user storage 114 further includes, for example, a product table 114B which may include details pertaining to particular products and services that may be marketed to the user. It is to be understood that other database tables may be utilized and stored in the user storage 114. In some implementations, the database tables may exist in other databases, for example, in databases that are outside of the organization associated with a particular tenant. As illustrated, the recommendation table 114A and the product table 114B are separate database tables, which means that these database tables are independently stored, modified, and maintained. Separate database tables generally do not contain references to each other's data.

Referring once again to FIG. 1B, the database system 16 also includes a user interface (UI) 30 and an application programming interface (API) 32. The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process space 110, for example. Invocations to such applications can be coded using PL/SOQL 34, which provides a programming language style interface extension to the API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, issued on Jun. 1, 2010, and hereby incorporated by reference herein in its entirety and for all purposes. Invocations to applications can be detected by one or more system processes, which manage retrieving application metadata 116 for the subscriber making the invocation and executing the metadata as an application in a virtual machine.

Each application server 100 can be communicably coupled with tenant database 22 and system database 24, for example, having access to tenant data 23 and system data 25, respectively, via a different network connection. For example, one application server $\mathbf{100}_1$ can be coupled via the network 14 (for example, the Internet), another application server $\mathbf{100}_2$ can be coupled via a direct network link, and another application server $\mathbf{100}_N$ can be coupled by yet a different network connection. Transfer Control Protocol and Internet Protocol (TCP/IP) are examples of typical protocols that can be used for communicating between application servers 100 and the database system 16. However, it will be apparent to one skilled in the art that other transport protocols can be used to optimize the database system 16 depending on the network interconnections used.

In some implementations, each application server 100 is configured to handle requests for any user associated with any organization that is a tenant of the database system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, database system 16 can be a multi-tenant system in which database system 16 handles storage of, and access to, different objects, data, and applications across disparate users and organizations.

In one example storage use case, one tenant can be a company that employs a sales force where each salesperson uses database system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by database system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the database system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the database system 16. Such requests and updates can involve sending one or more queries to tenant database 22 or system database 24. The database system 16 (for example, an application server 100 in the database system 16) can automatically generate one or more structured query language (SQL) statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, issued on Aug. 17, 2010, and hereby incorporated by reference herein in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figures 2A, 2B:
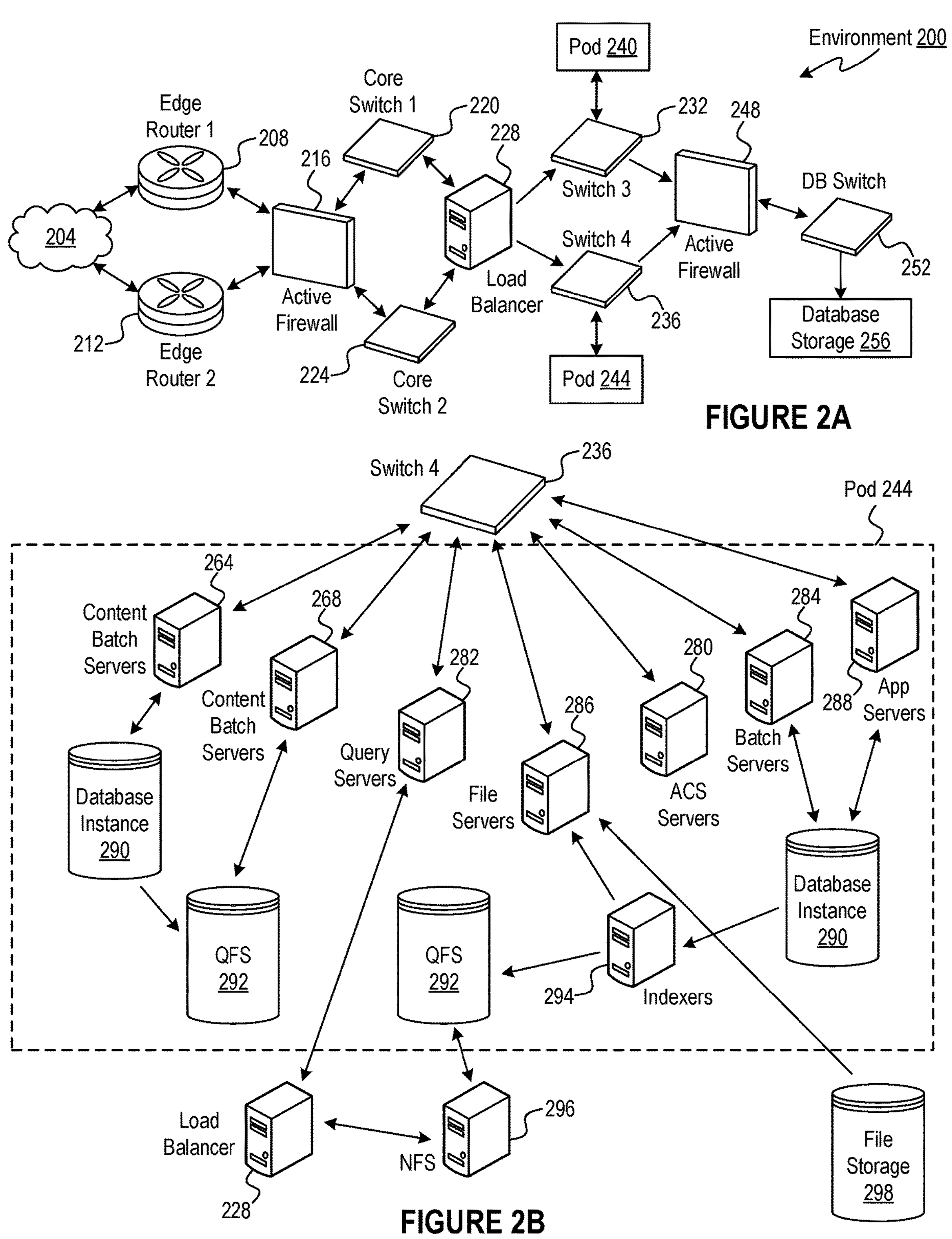
FIG. 2A shows a system diagram of example architectural components of an on-demand database service environment according to some implementations.
FIG. 2B shows a system diagram further illustrating example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server," "device," and "processing device" as used herein are not limited to a single hardware device; rather, references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of Internet Protocol (IP) networks or 'prefixes,' which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example, via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as SQL injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the pod switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file servers 286 can manage requests for information stored in the file storage 298. The file storage 298 can store information such as documents, images, and binary large objects (BLOBs). By managing requests for information using the file servers 286, the image footprint on the database can be reduced. The query servers 282 can be used to retrieve information from one or more file systems. For example, the query servers 282 can receive requests for information from the app servers 288 and transmit information queries to the network file systems (NFS) 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, the QFS 292 is an open source file system available from Sun Microsystems, Inc. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the NFS 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database instance 290 or QFS 292. The index information can be provided to the file servers 286 or the QFS 292.

Figure 3:
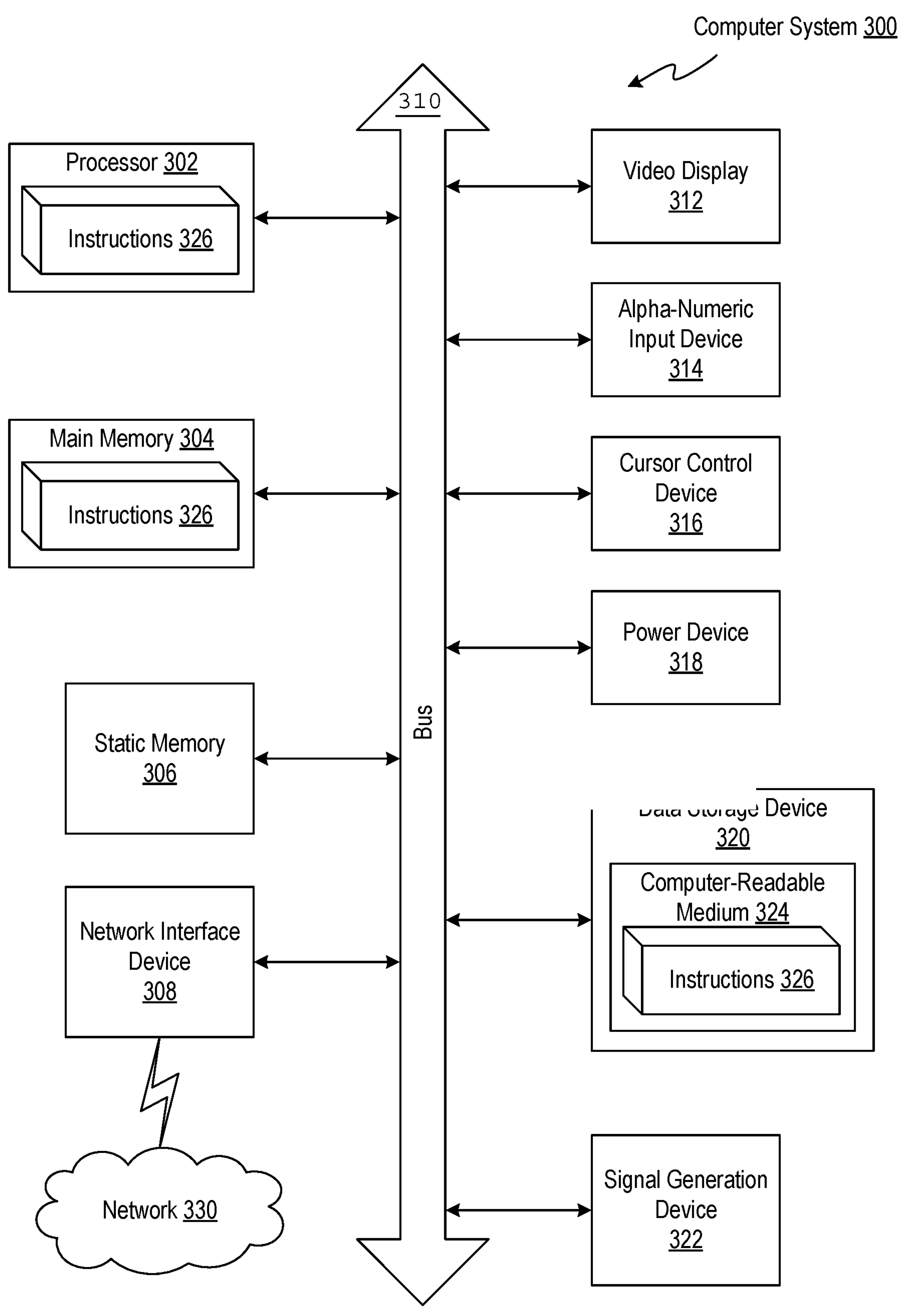
FIG. 3 illustrates a diagrammatic representation of a machine in the exemplary form of a computer system within which one or more implementations may be carried out.

FIG. 3 illustrates a diagrammatic representation of a machine in the exemplary form of a computer system 300 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 300 may be utilized by or illustrative of any of the electronic components described herein (e.g., any of the components illustrated in or described with respect to FIGS. 1A, 1B, 2A, and 2B).

The exemplary computer system 300 includes a processing device (processor) 302, a main memory 304 (e.g., ROM, flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 320, which communicate with each other via a bus 310.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 308. The computer system 300 also may include a video display unit 312 (e.g., a liquid crystal display (LCD), a cathode ray tube (CRT), or a touch screen), an alphanumeric input device 314 (e.g., a keyboard), a cursor control device 316 (e.g., a mouse), and a signal generation device 322 (e.g., a speaker).

Power device 318 may monitor a power level of a battery used to power the computer system 300 or one or more of its components. The power device 318 may provide one or more interfaces to provide an indication of a power level, a time window remaining prior to shutdown of computer system 300 or one or more of its components, a power consumption rate, an indicator of whether computer system is utilizing an external power source or battery power, and other power related information. In some implementations, indications related to the power device 318 may be accessible remotely (e.g., accessible to a remote back-up management module via a network connection). In some implementations, a battery utilized by the power device 318 may be an uninterruptable power supply (UPS) local to or remote from computer system 300. In such implementations, the power device 318 may provide information about a power level of the UPS.

The data storage device 320 may include a computer-readable storage medium 324 (e.g., a non-transitory computer-readable storage medium) on which is stored one or more sets of instructions 326 (e.g., software) embodying any one or more of the methodologies or functions described herein. The instructions 326 may also reside, completely or at least partially, within the main memory 304 and/or within the processor 302 during execution thereof by the computer system 300, the main memory 304, and the processor 302 also constituting computer-readable storage media. The instructions 326 may further be transmitted or received over a network 330 (e.g., the network 14) via the network interface device 308.

In one implementation, the instructions 326 include instructions for performing any of the implementations described herein. While the computer-readable storage medium 324 is shown in an exemplary implementation to be a single medium, it is to be understood that the computer-readable storage medium 324 may include a single medium or multiple media (e.g., a centralized or distributed database, and/or associated caches and servers) that store the one or more sets of instructions.

II. Enterprise Social Networking

As initially described above, in some implementations, some of the methods, processes, devices, and systems described herein can implement, or be used in the context of, enterprise social networking. An "enterprise" refers generally to a company or organization that owns one or more data centers that host various services and data sources. A "data center" refers generally to a physical location of various servers, machines, and network components utilized by an enterprise. Some online enterprise social networks can be implemented in various settings, including businesses, organizations, and other enterprises (all of which are used interchangeably herein). For instance, an online enterprise social network can be implemented to connect users within a business corporation, partnership, or organization, or a group of users within such an enterprise. For instance, Chatter® can be used by users who are employees in a business organization to share data, communicate, and collaborate with each other for various enterprise-related purposes. Some of the disclosed methods, processes, devices, systems, and computer-readable storage media described herein can be configured or designed for use in a multi-tenant database environment, such as described above with respect to the database system 16. In an example implementation, each organization or a group within the organization can be a respective tenant of the system.

In some implementations, each user of the database system 16 is associated with a "user profile." A user profile refers generally to a collection of data about a given user. The data can include general information, such as a name, a title, a phone number, a photo, a biographical summary, or a status (for example, text describing what the user is currently doing, thinking, or expressing). As described below, the data can include messages created by other users. In implementations in which there are multiple tenants, a user is typically associated with a particular tenant (or "organization"). For example, a user could be a salesperson of an organization that is a tenant of the database system 16. As used herein, a "customer" may be an individual or organization that receives emails or other data and communications from a user. A customer may also be a user in certain scenarios.

A "group" generally refers to a collection of users within an organization. In some implementations, a group can be defined as users with one or more same or a similar attributes, or by membership or subscription. Groups can have various visibilities to users within an enterprise social network. For example, some groups can be private while others can be public. In some implementations, to become a member within a private group, and to have the capability to publish and view feed items on the group's group feed, a user must request to be subscribed to the group (and be accepted by, for example, an administrator or owner of the group), be invited to subscribe to the group (and accept), or be directly subscribed to the group (for example, by an administrator or owner of the group). In some implementations, any user within the enterprise social network can subscribe to or follow a public group (and thus become a "member" of the public group) within the enterprise social network.

A "record" generally refers to a data entity, such as an instance of a data object created by a user or group of users of the database system 16. Such records can include, for example, data objects representing and maintaining data for accounts, cases, opportunities, leads, files, documents, orders, pricebooks, products, solutions, reports, and forecasts, among other possibilities. For example, a record can be for a partner or potential partner (for example, a client, vendor, distributor, etc.) of a user or a user's organization, and can include information describing an entire enterprise, subsidiaries of an enterprise, or contacts at the enterprise. As another example, a record can be a project that a user or group of users is/are working on, such as an opportunity with an existing partner, or a project that the user is trying to obtain. A record has data fields that are defined by the structure of the object (for example, fields of certain data types and purposes). A record also can have custom fields defined by a user or organization. A field can include (or include a link to) another record, thereby providing a parent-child relationship between the records.

Records also can have various visibilities to users within an enterprise social network. For example, some records can be private while others can be public. In some implementations, to access a private record, and to have the capability to publish and view feed items on the record's record feed, a user must request to be subscribed to the record (and be accepted by, for example, an administrator or owner of the record), be invited to subscribe to the record (and accept), be directly subscribed to the record or be shared the record (for example, by an administrator or owner of the record). In some implementations, any user within the enterprise social network can subscribe to or follow a public record within the enterprise social network.

In some online enterprise social networks, users also can follow one another by establishing "links" or "connections" with each other, sometimes referred to as "friending" one another. By establishing such a link, one user can see information generated by, generated about, or otherwise associated with another user. For instance, a first user can see information posted by a second user to the second user's profile page. In one example, when the first user is following the second user, the first user's news feed can receive a post from the second user submitted to the second user's profile feed.

In some implementations, users can access one or more enterprise network feeds (also referred to herein simply as "feeds"), which include publications presented as feed items or entries in the feed. A network feed can be displayed in a GUI on a display device such as the display of a user's computing device as described above. The publications can include various enterprise social network information or data from various sources and can be stored in the database system 16, for example, in tenant database 22. In some implementations, feed items of information for or about a user can be presented in a respective user feed, feed items of information for or about a group can be presented in a respective group feed, and feed items of information for or about a record can be presented in a respective record feed. A second user following a first user, a first group, or a first record can automatically receive the feed items associated with the first user, the first group, or the first record for display in the second user's news feed. In some implementations, a user feed also can display feed items from the group feeds of the groups the respective user subscribes to, as well as feed items from the record feeds of the records the respective user subscribes to.

The term "feed item" (or feed element) refers to an item of information, which can be viewable in a feed. Feed items can include publications such as messages (for example, user-generated textual posts or comments), files (for example, documents, audio data, image data, video data or other data), and "feed-tracked" updates associated with a user, a group, or a record (feed-tracked updates are described in greater detail below). A feed item, and a feed in general, can include combinations of messages, files, and feed-tracked updates. Documents and other files can be included in, linked with, or attached to a post or comment. For example, a post can include textual statements in combination with a document. The feed items can be organized in chronological order or another suitable or desirable order (which can be customizable by a user) when the associated feed is displayed in a GUI, for instance, on the user's computing device.

Messages such as posts can include alpha-numeric or other character-based user inputs such as words, phrases, statements, questions, emotional expressions, or symbols. In some implementations, a comment can be made on any feed item. In some implementations, comments are organized as a list explicitly tied to a particular feed item such as a feed-tracked update, post, or status update. In some implementations, comments may not be listed in the first layer (in a hierarchal sense) of feed items, but listed as a second layer branching from a particular first layer feed item. In some implementations, a "like" or "dislike" also can be submitted in response to a particular post, comment, or other publication.

A "feed-tracked update," also referred to herein as a "feed update," is another type of publication that may be presented as a feed item and generally refers to data representing an event. A feed-tracked update can include text generated by the database system in response to the event, to be provided as one or more feed items for possible inclusion in one or more feeds. In one implementation, the data can initially be stored by the database system in, for example, tenant database 22, and subsequently used by the database system to create text for describing the event. Both the data and the text can be a feed-tracked update, as used herein. In some implementations, an event can be an update of a record and can be triggered by a specific action by a user. Which actions trigger an event can be configurable. Which events have feed-tracked updates created and which feed updates are sent to which users also can be configurable. Messages and feed updates can be stored as a field or child object of a record. For example, the feed can be stored as a child object of the record.

As described above, a network feed can be specific to an individual user of an online social network. For instance, a user news feed (or "user feed") generally refers to an aggregation of feed items generated for a particular user, and in some implementations, is viewable only to the respective user on a home page of the user. In some implementations a user profile feed (also referred to as a "user feed") is another type of user feed that refers to an aggregation of feed items generated by or for a particular user, and in some implementations, is viewable only by the respective user and other users following the user on a profile page of the user. As a more specific example, the feed items in a user profile feed can include posts and comments that other users make about or send to the particular user, and status updates made by the particular user. As another example, the feed items in a user profile feed can include posts made by the particular user and feed-tracked updates initiated based on actions of the particular user.

As is also described above, a network feed can be specific to a group of enterprise users of an online enterprise social network. For instance, a group news feed (or "group feed") generally refers to an aggregation of feed items generated for or about a particular group of users of the database system 16 and can be viewable by users following or subscribed to the group on a profile page of the group. For example, such feed items can include posts made by members of the group or feed-tracked updates about changes to the respective group (or changes to documents or other files shared with the group). Members of the group can view and post to a group feed in accordance with a permissions configuration for the feed and the group. Publications in a group context can include documents, posts, or comments. In some implementations, the group feed also includes publications and other feed items that are about the group as a whole, the group's purpose, the group's description, a status of the group, and group records and other objects stored in association with the group. Threads of publications including updates and messages, such as posts, comments, likes, etc., can define conversations and change over time. The following of a group allows a user to collaborate with other users in the group, for example, on a record or on documents or other files (which may be associated with a record).

As is also described above, a network feed can be specific to a record in an online enterprise social network. For instance, a record news feed (or "record feed") generally refers to an aggregation of feed items about a particular record in the database system 16 and can be viewable by users subscribed to the record on a profile page of the record. For example, such feed items can include posts made by users about the record or feed-tracked updates about changes to the respective record (or changes to documents or other files associated with the record). Subscribers to the record can view and post to a record feed in accordance with a permissions configuration for the feed and the record. Publications in a record context also can include documents, posts, or comments. In some implementations, the record feed also includes publications and other feed items that are about the record as a whole, the record's purpose, the record's description, and other records or other objects stored in association with the record. Threads of publications including updates and messages, such as posts, comments, likes, etc., can define conversations and change over time. The following of a record allows a user to track the progress of that record and collaborate with other users subscribing to the record, for example, on the record or on documents or other files associated with the record.

In some implementations, data is stored in the database system 16, including tenant database 22, in the form of "entity objects" (also referred to herein simply as "entities"). In some implementations, entities are categorized into "Records objects" and "Collaboration objects." In some such implementations, the Records object includes all records in the enterprise social network. Each record can be considered a sub-object of the overarching Records object. In some implementations, Collaboration objects include, for example, a "Users object," a "Groups object," a "Group-User relationship object," a "Record-User relationship object," and a "Feed Items object."

In some implementations, the Users object is a data structure that can be represented or conceptualized as a "Users Table" that associates users to information about or pertaining to the respective users including, for example, metadata about the users. In some implementations, the Users Table includes all of the users within an organization. In some other implementations, there can be a Users Table for each division, department, team or other sub-organization within an organization. In implementations in which the organization is a tenant of a multi-tenant enterprise social network platform, the Users Table can include all of the users within all of the organizations that are tenants of the multi-tenant enterprise social network platform. In some implementations, each user can be identified by a user identifier ("UserID") that is unique at least within the user's respective organization. In some such implementations, each organization also has a unique organization identifier ("OrgID").

In some implementations, the Groups object is a data structure that can be represented or conceptualized as a "Groups Table" that associates groups to information about or pertaining to the respective groups including, for example, metadata about the groups. In some implementations, the Groups Table includes all of the groups within the organization. In some other implementations, there can be a Groups Table for each division, department, team, or other sub-organization within an organization. In implementations in which the organization is a tenant of a multi-tenant enterprise social network platform, the Groups Table can include all of the groups within all of the organizations that are tenants of the multitenant enterprise social network platform. In some implementations, each group can be identified by a group identifier ("GroupID") that is unique at least within the respective organization.

In some implementations, the database system 16 includes a "Group-User relationship object." The Group-User relationship object is a data structure that can be represented or conceptualized as a "Group-User Table" that associates groups to users subscribed to the respective groups. In some implementations, the Group-User Table includes all of the groups within the organization. In some other implementations, there can be a Group-User Table for each division, department, team, or other sub-organization within an organization. In implementations in which the organization is a tenant of a multi-tenant enterprise social network platform, the Group-User Table can include all of the groups within all of the organizations that are tenants of the multitenant enterprise social network platform.

In some implementations, the Records object is a data structure that can be represented or conceptualized as a "Records Table" that associates records to information about or pertaining to the respective records including, for example, metadata about the records. In some implementations, the Records Table includes all of the records within the organization. In some other implementations, there can be a Records Table for each division, department, team, or other sub-organization within an organization. In implementations in which the organization is a tenant of a multi-tenant enterprise social network platform, the Records Table can include all of the records within all of the organizations that are tenants of the multitenant enterprise social network platform. In some implementations, each record can be identified by a record identifier ("RecordID") that is unique at least within the respective organization.

In some implementations, the database system 16 includes a "Record-User relationship object." The Record-User relationship object is a data structure that can be represented or conceptualized as a "Record-User Table" that associates records to users subscribed to the respective records. In some implementations, the Record-User Table includes all of the records within the organization. In some other implementations, there can be a Record-User Table for each division, department, team, or other sub-organization within an organization. In implementations in which the organization is a tenant of a multi-tenant enterprise social network platform, the Record-User Table can include all of the records within all of the organizations that are tenants of the multitenant enterprise social network platform.

In some implementations, the database system 16 includes a "Feed Items object." The Feed Items object is a data structure that can be represented or conceptualized as a "Feed Items Table" that associates users, records, and groups to posts, comments, documents, or other publications to be displayed as feed items in the respective user feeds, record feeds, and group feeds, respectively. In some implementations, the Feed Items Table includes all of the feed items within the organization. In some other implementations, there can be a Feed Items Table for each division, department, team, or other sub-organization within an organization. In implementations in which the organization is a tenant of a multi-tenant enterprise social network platform, the Feed Items Table can include all of the feed items within all of the organizations that are tenants of the multitenant enterprise social network platform.

Enterprise social network news feeds are different from typical consumer-facing social network news feeds (for example, FACEBOOK®) in many ways, including in the way they prioritize information. In consumer-facing social networks, the focus is generally on helping the social network users find information that they are personally interested in. But in enterprise social networks, it can, in some instances, applications, or implementations, be desirable from an enterprise's perspective to only distribute relevant enterprise-related information to users and to limit the distribution of irrelevant information. In some implementations, relevant enterprise-related information refers to information that would be predicted or expected to benefit the enterprise by virtue of the recipients knowing the information, such as an update to a database record maintained by or on behalf of the enterprise. Thus, the meaning of relevance differs significantly in the context of a consumer-facing social network as compared with an employee-facing or organization member-facing enterprise social network.

In some implementations, when data such as posts or comments from one or more enterprise users are submitted to a network feed for a particular user, group, record or other object within an online enterprise social network, an email notification, or other type of network communication may be transmitted to all users following the respective user, group, record, or object in addition to the inclusion of the data as a feed item in one or more user, group, record, or other feeds. In some online enterprise social networks, the occurrence of such a notification is limited to the first instance of a published input, which may form part of a larger conversation. For instance, a notification may be transmitted for an initial post, but not for comments on the post. In some other implementations, a separate notification is transmitted for each such publication, such as a comment on a post.

III. Generation of Recommendations

Reference is now made to FIG. 4, which illustrates an exemplary GUI 400 for presenting recommendations according to some implementations. The GUI 400 is represented as a console window 402 that may be presented to a user in a form of a webpage or an app. The console window 402 includes various panels for displaying interactive content, including a header panel 404 and content panels 406 and 408. One or more of the panels may be stationary or adjustable. In some implementations, a user may add or remove one or more of the panels.

In some implementations, each panel displays content specific to a particular user, and may be populated with data retrieved from, for example, tenant database 22. In some implementations, the console window 402 acts as a user portal for a web-based CRM system. The CRM system may provide data from a CRM database, which is formatted for display in one or more of the panels of the console window 402. For example, the content panel 408 may include contact information for various customers, including names, addresses, phone numbers, etc. As another example, the content panel 408 may include information pertaining to purchase orders, such as customer information, product details, sale price, date of sale, etc. In some implementations, product details may be retrieved from a product database (e.g., product table 114B) for display in one or more panels.

The console window 402 further includes recommendations 410 and 420, which may be generated based on data contained in respective recommendation objects in accordance with the implementations described herein. Each recommendation may be presented in a similar manner as the panels within the console window 402 as shown. In some implementations, the recommendations 410 and 420 may be presented in a different manner, for example, as pop-up windows that appear over the panels of the console window 402. In some implementations, fewer recommends than those shown or additional recommendations may be presented.

The recommendations 410 and 420 may include static content (e.g., images and/or text) or dynamic content (e.g., buttons, checkboxes, etc.). The recommendation 410 may include a message prompting the user to take a specific action, and provides the user with options for responding. Recommendation 410, for example, includes a confirm button 412 and a decline button 414. In response to selecting the confirm button 412, the recommendation may load additional information, redirect the user to a new webpage, update content contained within one of the content panels, or perform some other action. In response to selecting the decline button 414, this may cause the recommendation 410 to be dismissed, which may result in the recommendation 410 being removed from the console window 402, along with the ability to perform an action associated with selection of the confirm button 412. Similarly, the recommendation 420 includes a single dismiss button 416, which may dismiss the recommendation 420 upon selection thereof. The recommendation 420, for example, may be a reminder to take a particular action that does not include any further functionality.

In some implementations, a recommendation object is user generated. At the time of generating the recommendation object, a user may manually enter data into one or more fields including, but not limited to: a name field that specifies a title of the recommendation; a description that is displayed at the time the recommendation is graphically presented; a static image, an animated image, or a movie file that is displayed at the time the recommendation is graphically presented; an acceptance label that specifies the label for a button that a customer may click to accept the recommendation (e.g., "confirm" on the confirm button 412); a rejection label that specifies the label for a button that the customer may click to reject, decline, or dismiss the recommendation (e.g., "decline" on the decline button 414); and an action that triggers a process flow in response to the customer accepting the recommendation.

In an example implementation, the recommendation 410 may include an indication that a particular customer is past due on a bill. Selection of the confirm button 412 may result in an action that transmits a reminder to the late customer, while selection of the decline button 414 may result in dismissal of the recommendation 410. As another example, the recommendation 410 may include a product recommendation for the user. The recommendation 410 may include information tailored to the user, which may be sourced from a recommendation table (e.g., recommendation table 114A) containing user-specific data. The recommendation 410 may further include information not included in the recommendation that is pulled from another data source such as a product table that contains information associated with the recommended product (e.g., the product table 114B).

In some implementations, predictive intelligence may be utilized to determine what recommendations to present, when to present them, and actions available. For example, predictions based on artificial intelligence (AI) can be used, for example, to predict which types of recommendations are likely to be useful and relevant to a particular user. In one implementation, Salesforce Einstein (e.g., Einstein Next Best Action) or similar AI technologies can be used to deliver advanced AI capabilities into sales, service, and marketing applications to provide a personalized and predictive customer experience for the user. Salesforce Einstein embeds advanced AI capabilities in the Salesforce Platform in, for example, fields, objects, workflows, and various components. In some implementations, Salesforce Einstein leverages customer data in a user's organization including activity data from Salesforce Chatter, email, calendar and e-commerce; social data streams such as tweets and images; and even Internet of Things (IoT) signals, which may be used to train predictive models for sales, service, marketing, and commerce.

Figure 5:
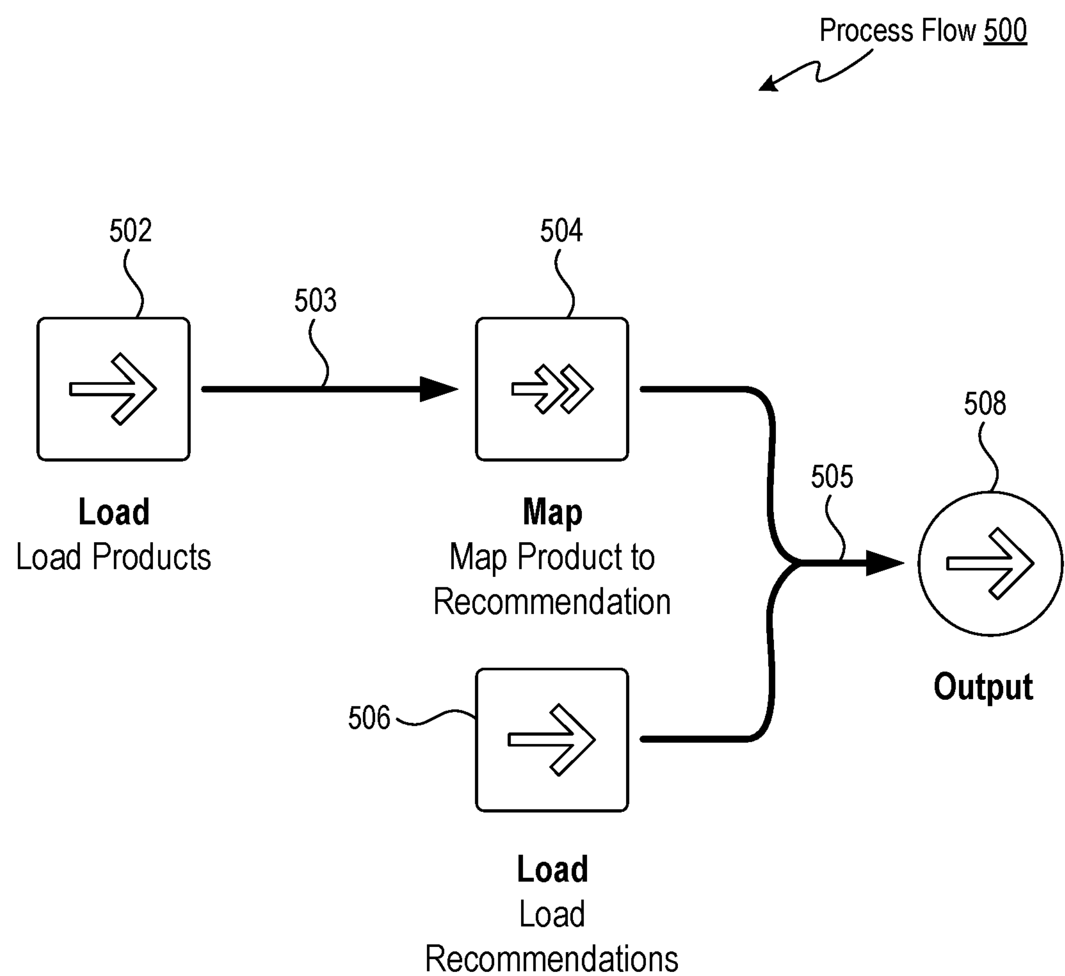
FIG. 5 illustrates an exemplary graphical user interface implementing a process flow for mapping data to a recommendation object according to some implementations.

FIG. 5 illustrates an exemplary GUI implementing a process flow 500 for mapping data to a recommendation object according to some implementations. In some implementations, recommendation objects reference a process flow that governs the way data is loaded, formatted, and otherwise processed for inclusion into the recommendation object. For example, recommendations generated using Einstein Next Best Action may reference process flows that are represented graphically as interconnected nodes, such as the process flow 500. The present implementations enable the visual generation of process flows that can operate on and load data from any sObject in the Salesforce Platform without requiring a user to write code (e.g., SQL queries).

The process flow 500 includes a number of operations depicted visually as nodes, including a first load node 502, a map node 504, a second load node 506, and an output node 508. Each node is connected to one or more nodes through flow connectors. For example, flow connector 503 connects the first load node 502 with the map node 504, and flow connector 505 connects the map node 504 and the second load node 506 to the output node 508. The flow connector 505 represents a union operation to include data from multiple sources as part of a single output.

In some implementations, each node includes a label indicating the type of node (e.g., "Load," "Map," "Output") and a description of the function (e.g., "Load Products," "Map Product to Recommendation," "Load Recommendations"), which may be user-specified. In some implementations, the first load node 502 and the second load node 506 perform generic load functions and may load data from any specified and accessible data source. At runtime, the load nodes may result in the execution of SQL queries that load data from the specified data source (e.g., the tenant database 22).

In some implementations, the map node 504 represents a mapping operation that maps a structured data object of any shape (i.e., tree structure) into the recommendation object associated with the process flow 500. The mapping operation may dynamically map data from a database to one or more fields of the recommendation object without duplicating data in the database. For example, the mapping operation can map data from a product table (e.g., the product table 114B) to the recommendation object without duplicating any of the mapped data within a different database table (e.g., the recommendation table 114A). Moreover, updates to the mapped data may be pushed to a generated recommendation at runtime in response to changes in the source data.

In some implementations, the map operation is defined by a pair of expressions: outputField and mapExpression. Each mapExpression may be evaluated in the context of the source data (e.g., data from the product table 114B) and assign the output value to the associated outputField. When all expressions are evaluated at runtime (e.g, when the recommendation is generated from the recommendation object), the values are added to the recommendation object.

Figure 6:
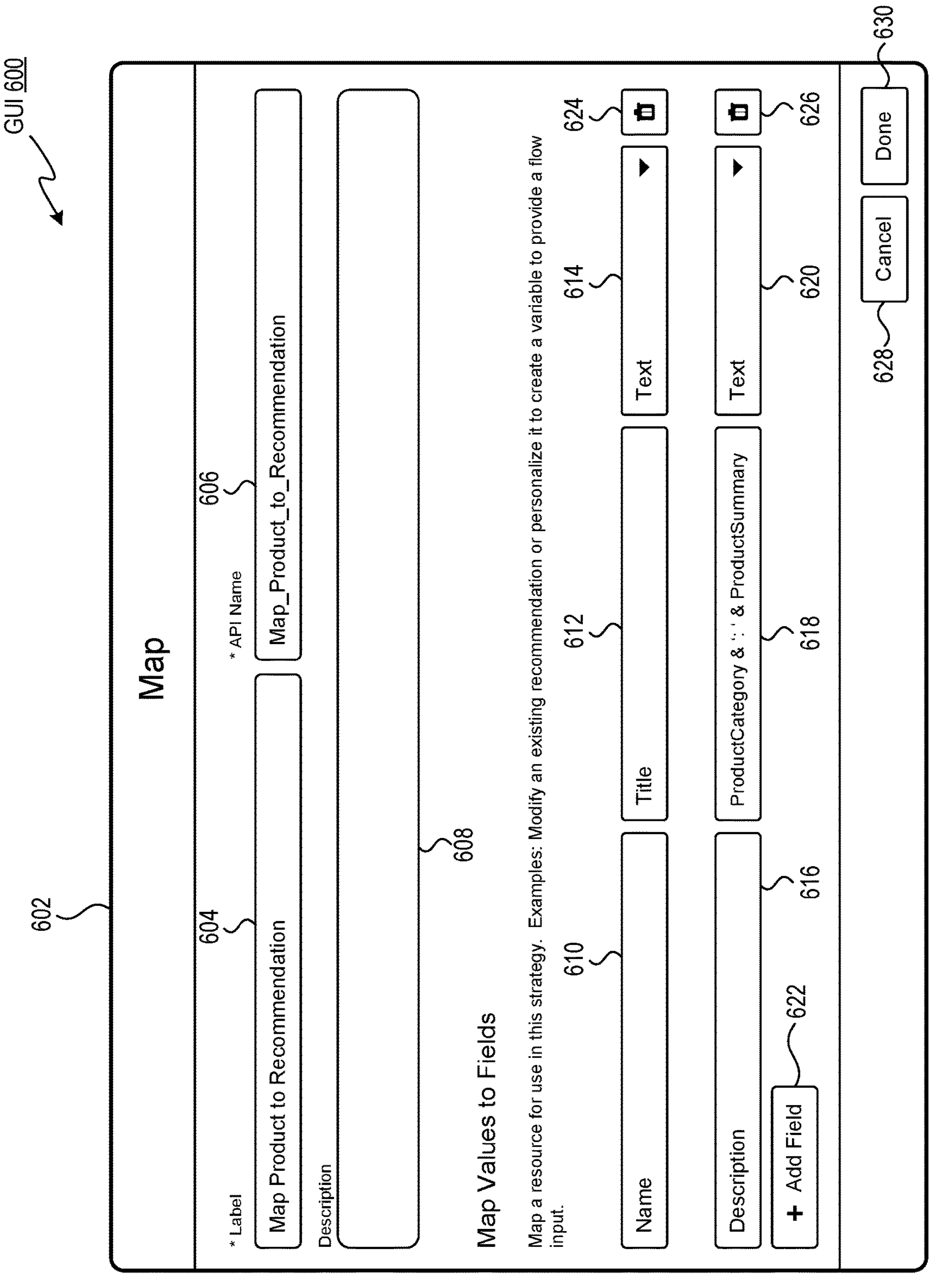
FIG. 6 illustrates an exemplary graphical user interface for selecting data to be mapped to a recommendation object according to some implementations.

FIG. 6 illustrates an exemplary GUI 600 for selecting data to be mapped to a recommendation object according to some implementations. In some implementations, an edit window 602 is presented to the user in response to selecting the map node 504 in the process flow 500. In the edit window 602, the user may specify various fields, such as a label 604 (which sets the "Map Product to Recommendation" description displayed next to the map node 504 in the process flow 500), an API name 606, and a description 608 which may contain further details about the mapping operation. The edit window 602 may contain one or more fields, which may be added using the add field button 622, or deleted using respective delete buttons 624 and 626. As an example, a first field includes a field label 610 and a mapping expression 612 (which may correspond to the expressions outputField and mapExpression, respectively). The first field also includes a data type indicator 614, which may be a drop down list from which the user can select a type of data that should be mapped to the field (e.g., text, image data, etc.). As illustrated, the evaluation of the mapping expression 612 results in mapping of the field label 610 to a "Title" data object. As a further example, a second field includes a field label 616, a mapping expression 612, and a data type indicator 620. As illustrated, evaluation of the mapping expression 618 results in mapping of the field label 616 to product information (i.e., "ProductCategory" and "ProductSummary" data objects), which may be stored in a separate database (e.g., the product table 114B) than other data used by the recommendation object (e.g., the recommendation table 114A). The user may select the done button 630 to accept changes made to the mapping operation, or may select the cancel button 628 to cancel any changes. In either case, the selection will result, in some implementations, in the user being returned to the GUI with the process flow 500.

Figure 7:
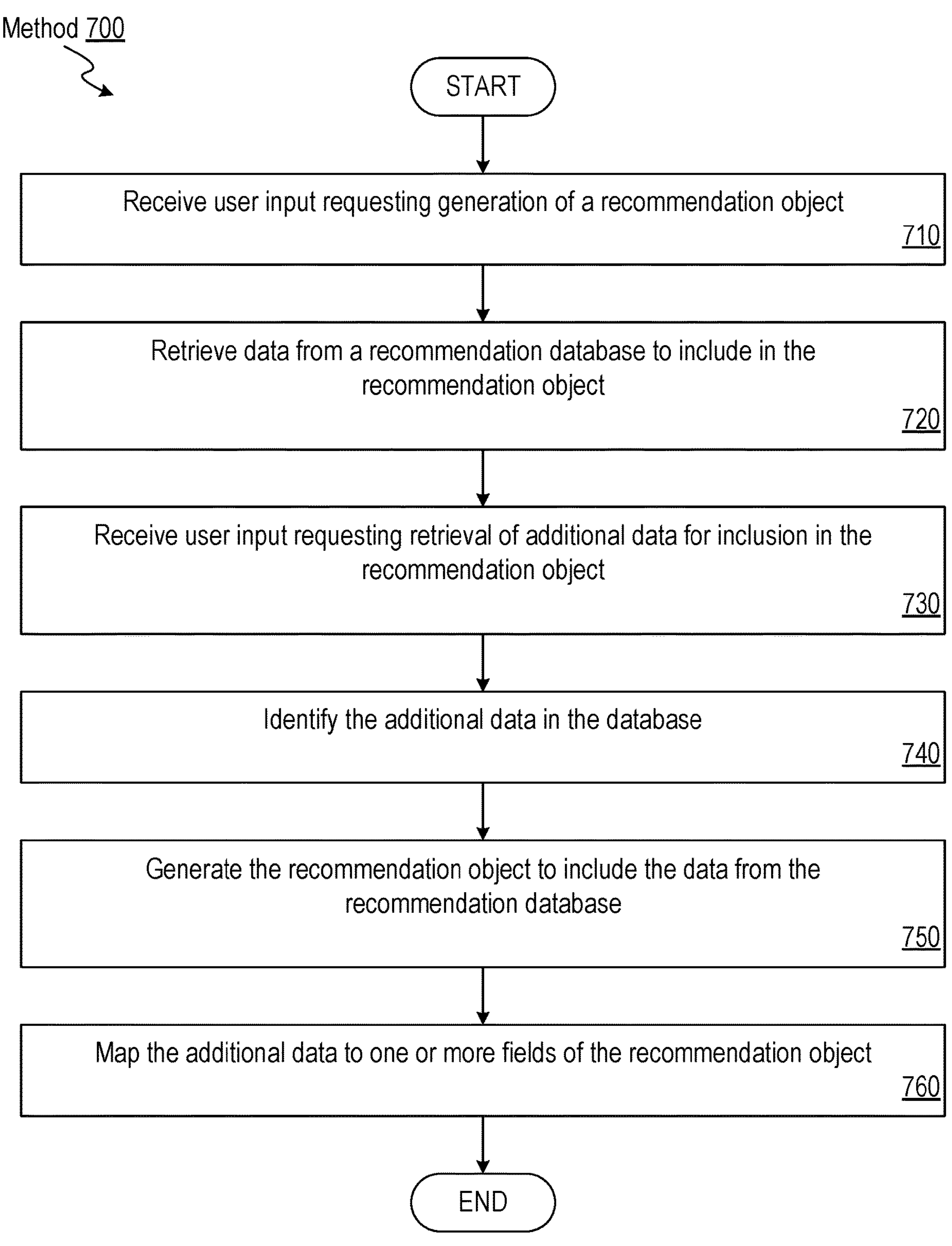
FIG. 7 is a flow diagram illustrating a method for performing data resolution according to some implementations.

FIG. 7 is a flow diagram illustrating a method 700 for generating recommendations from dynamically-mapped data according to some implementations. The method 700 may be performed by processing logic comprising hardware (e.g., circuitry, dedicated logic, programmable logic, microcode, etc.), software (such as instructions run on a processing device), or a combination thereof. In one implementation, the method 700 may be performed by one or more processing devices associated with a host database system (e.g., implemented on the application server 100).

Referring to FIG. 7, at block 710, a processing device (e.g., a processing device of a user system 12 or a database system 16 implementing a recommendation strategy API) receives a first request to generate a recommendation object. The first request may be received, for example, during implementation of a GUI (e.g., the GUI 400), where a customer's interaction with the GUI 400 triggers a request to generate a recommendation object targeted to that customer. In some implementations, the first request may be made by a user (e.g., developer) of a recommendation strategy API (e.g., to generate a recommendation object that may be served on a customer during the customer's interaction with the GUI 400). In some implementations, the request may be a request to generate a new process flow (e.g., the process flow 500) that is to be associated with a recommendation object. In some implementations, the user may interact with the node in order add or modify information associated with the recommendation object (e.g., using the edit window 602). In some implementations, the first request may be to generate a set of recommendation objects. It is to be understood that the term "a recommendation object" is not limited to a single recommendation object, and the method 700 may be adapted to generate a set of recommendation objects from one or more requests.

At block 720, the processing device retrieves recommendation data from a first database table (e.g., the recommendation table 114A) to include in the recommendation object. In some implementations, the recommendation data includes data from one or more predefined recommendation objects, which may be modifiable in order to generate a customized recommendation object. In some implementations, the recommendation data may correspond to data tailored for a particular end user (e.g., customer), and may have been previously generated for that end user and stored in association with the end user's organization (e.g., the tenant database 22).

At block 730, the processing device receives a second request to retrieve additional data to include in the recommendation object. The second request may be received before, after, concurrently with, or as part of the first request. The second request may be received, for example, during implementation of a GUI (e.g., editing of the process flow 500). In some implementations, the second request may be depicted visually as a node within a process flow (e.g., the first load node 502). In some implementations, the additional data may include, for example, data unrelated to user recommendations, and may correspond to product or service information, business information, scheduling information, or any other information that could potentially be compiled and served onto an end user via a GUI (e.g., the GUI 400). In some implementations, the additional data is stored as a structured data object. A hierarchy of the structured data object may differ from that of any other structured data object that may be potentially requested for inclusion in the recommendation object, and may differ structurally from the requested recommendation data. That is, the request may be agnostic to a data hierarchy of additional data that is requested.

At block 740, the processing device identifies the additional data in a second database table (e.g., the product table 114B) that is stored separately from the first database table (e.g., the recommendation table 114A). In some implementations, the second database table is user-specified. For example, in some implementations, the second database table may be specified by indicating in a mapping expression (e.g., the mapping expression 618) the name of one or more globally-recognized objects that are traceable to the second database table.

At block 750, the processing device generates the recommendation object to include the data from the recommendation database. In some implementations, a recommendation object will be generated by populating data fields with the data retrieved from the first database table. In some implementations, the retrieved data may have been user-specified.

At block 760, the processing device maps the additional data to one or more fields of the recommendation object. In some implementations, mapping the additional data comprises generating SQL statements that, when executed, retrieve the additional data of the second database table such that the recommendation object is hydrated with the additional data at runtime. In some implementations, the mapping of the additional data results is performed without duplicating the additional data in the first database table. For example, the additional data may be pulled into the recommendation object at runtime (e.g., when the recommendation is served to a user) without updating the first database table or any other database table to store the additional data in duplicate. In some implementations, the additional data is stored as a structured data object, and wherein the mapping of the additional data is agnostic to a data hierarchy of the structured data object.

In some implementations, the processing device generates for presentation a GUI that visually represents retrieval of the recommendation data, retrieval of additional data for inclusion in the recommendation object, mapping of the additional data, and generation of the recommendation object as a process flow (e.g., the process flow 500). For example, in some implementations, each operation may be represented as a node: the retrieval of the recommendation data being represented as the second load node 506; the retrieval of additional data being represented as the first load node 502; the mapping of the additional data being represented as the map node 504, and the generation of the recommendation object being represented as the output node 508. In some implementations, the mapping of the additional data is visually represented as a map node (e.g., the map node 504) that links nodes representative of retrieval of the additional data (e.g., the first load node 502) and the generation of the recommendation object (e.g., the output node 508).

In the foregoing description, numerous details are set forth. It will be apparent, however, to one of ordinary skill in the art having the benefit of this disclosure, that the present disclosure may be practiced without these specific details. While specific implementations have been described herein, it should be understood that they have been presented by way of example only, and not limitation. The breadth and scope of the present application should not be limited by any of the implementations described herein, but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A computer-implemented method comprising:

receiving, by a processing device of a database system, a first request to generate a recommendation object;

retrieving, by the processing device, recommendation data from a first database table to include in the recommendation object;

receiving, by the processing device, a second request to retrieve additional data to include in the recommendation object, wherein the first request and the second request is derived from a process flow generated by a user of a graphical user interface (GUI), the process flow being generated by:

providing, in the GUI to a device, functionality to visually insert, edit, and connect nodes representative of a plurality of operations via one or more connectors without requiring a user to write code depicted visually as interconnected nodes for which connectivity of the nodes is modifiable by the user, wherein one or more of the nodes is associated with a load operation of the recommendation data and the additional data, and the additional data is visually mapped to link the retrieval of the additional data and a generation of the recommendation object in the GUI; and receiving the process flow from the device resulting from user-specified interactions received by the GUI;

generating, by the processing device, one or more queries based on the second request;

identifying, by the processing device, the additional data in a second database table that is stored separately from the first database table;

generating, by the processing device, the recommendation object to include the recommendation data from the first database table; and mapping, by the processing device, the additional data to one or more fields of the recommendation object based on the additional data being mapped to the recommendation object in the GUI.

2. The computer-implemented method of claim 1, wherein:

mapping the additional data comprises generating structured query language (SQL) statements to retrieve the additional data of the second database table, and the recommendation object is hydrated with the additional data at runtime.

3. The computer-implemented method of claim 2, wherein:

the additional data is stored as a structured data object, and the mapping of the additional data is agnostic to a data hierarchy of the structured data object.

4. The computer-implemented method of claim 1, wherein the additional data is mapped to the recommendation object without duplicating the additional data in the first database table.

5. The computer-implemented method of claim 1, further comprising:

generating for presentation, by the processing device, the GUI which visually represents retrieval of the recommendation data, retrieval of additional data for inclusion in the recommendation object, mapping of the additional data, and generation of the recommendation object as a process flow.

6. The computer-implemented method of claim 5, wherein each of the retrieval of the recommendation data, the retrieval of additional data for inclusion in the recommendation object, the mapping of the additional data, and the generation of the recommendation object is visually as associated with a node within the process flow.

7. The computer-implemented method of claim 6, wherein the mapping of the additional data is visually represented as a map node which links nodes representative of the retrieval of the additional data and the generation of the recommendation object.

8. The computer-implemented method of claim 1, wherein the recommendation object is based on an up next recommendation.

9. The computer-implemented method of claim 1, wherein the recommendation data comprises a customer relationship management (CRM) record.

10. The computer-implemented method of claim 1, wherein the additional data comprises scheduling information.

11. The computer-implemented method of claim 1, wherein the additional data in the second database table is mapped to the recommendation object.

12. The computer-implemented method of claim 1, wherein the additional data in a second database table is mapped to the one or more fields via a schema.

13. The computer-implemented method of claim 1, wherein the additional data comprises a prompt to take an action.

14. A database system comprising:

a processing device; and a memory device coupled to the processing device, the memory device having instructions stored thereon that, in response to execution by the processing device, cause the processing device to:

receive a first request to generate a recommendation object;

retrieve recommendation data from a first database table to include in the recommendation object;

receive a second request to retrieve additional data to include in the recommendation object, wherein the first request and the second request is derived from a process flow generated by a user of a graphical user interface (GUI), the process flow being generated by:

provide, in the GUI to a device, functionality to visually insert, edit, and connect nodes representative of a plurality of operations via one or more connectors without requiring a user to write code depicted visually as interconnected nodes for which connectivity of the nodes is modifiable by the user, wherein one or more of the nodes is associated with a load operation of the recommendation data and the additional data, and the additional data is visually mapped to link the retrieval of the additional data and a generation of the recommendation object in the GUI; and receive the process flow from the device resulting from user-specified interactions received by the GUI;

generate one or more queries based on the second request;

identify the additional data in a second database table that is stored separately from the first database table;

generate the recommendation object to include the recommendation data from the first database table; and map the additional data to one or more fields of the recommendation object based on the additional data being mapped to the recommendation object in the GUI.

15. The database system of claim 14, wherein the recommendation object is based on an up next recommendation.

16. The database system of claim 14, wherein the recommendation data comprises a customer relationship management (CRM) record.

17. The database system of claim 14, wherein the additional data comprises scheduling information.

18. The database system of claim 14, wherein the additional data in the second database table is mapped to the recommendation object.

19. The database system of claim 14, wherein the additional data in a second database table is mapped to the one or more fields via a schema.

20. A non-transitory computer-readable storage medium having instructions encoded thereon which, when executed by a processing device, cause the processing device to:

receive a first request to generate a recommendation object;

retrieve recommendation data from a first database table to include in the recommendation object;

receive a second request to retrieve additional data to include in the recommendation object, wherein the first request and the second request is derived from a process flow generated by a user of a graphical user interface (GUI), the process flow being generated by:

provide, in the GUI to a device, functionality to visually insert, edit, and connect nodes representative of a plurality of operations via one or more connectors without requiring a user to write code depicted visually as interconnected nodes for which connectivity of the nodes is modifiable by the user, wherein one or more of the nodes is associated with a load operation of the recommendation data and the additional data, and the additional data is visually mapped to link the retrieval of the additional data and a generation of the recommendation object in the GUI; and receive the process flow from the device resulting from user-specified interactions received by the GUI;

generate one or more queries based on the second request;

identify the additional data in a second database table that is stored separately from the first database table;

generate the recommendation object to include the recommendation data from the first database table; and map the additional data to one or more fields of the recommendation object based on the additional data being mapped to the recommendation object in the GUI.

* * * * *